US012183292B2

(12) United States Patent
Hu et al.

(10) Patent No.: US 12,183,292 B2
(45) Date of Patent: Dec. 31, 2024

(54) BACKLIGHT DRIVING METHOD AND DISPLAY PANEL

(71) Applicant: TCL China Star Optoelectronics Technology Co., Ltd., Shenzhen (CN)

(72) Inventors: Daobing Hu, Shenzhen (CN); Guangmiao Wan, Shenzhen (CN); Hang Wang, Shenzhen (CN); Xu Wang, Shenzhen (CN); Cong Hu, Shenzhen (CN); Hongyuan Xu, Shenzhen (CN); Woosung Son, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/289,291

(22) PCT Filed: Apr. 25, 2021

(86) PCT No.: PCT/CN2021/089595
§ 371 (c)(1),
(2) Date: Dec. 22, 2023

(87) PCT Pub. No.: WO2022/217642
PCT Pub. Date: Oct. 20, 2022

(65) Prior Publication Data

US 2024/0127761 A1 Apr. 18, 2024

(30) Foreign Application Priority Data

Apr. 12, 2021 (CN) ....................... 2021110389512.1

(51) Int. Cl.
*G09G 3/34* (2006.01)
*G09G 3/32* (2016.01)

(52) U.S. Cl.
CPC ............. *G09G 3/3406* (2013.01); *G09G 3/32* (2013.01); *G09G 2300/0842* (2013.01); *G09G 2310/08* (2013.01); *G09G 2320/064* (2013.01)

(58) Field of Classification Search
None
See application file for complete search history.

(56) References Cited

U.S. PATENT DOCUMENTS

2007/0262732 A1 11/2007 Shen

FOREIGN PATENT DOCUMENTS

| | | | |
|---|---|---|---|
| CN | 101419789 | A | 4/2009 |
| CN | 101751866 | A | 6/2010 |
| CN | 102216975 | A | 10/2011 |
| CN | 104575399 | A | 4/2015 |
| CN | 107452344 | A | 12/2017 |
| CN | 108257549 | A | 7/2018 |
| CN | 110782831 | A | 2/2020 |

(Continued)

*Primary Examiner* — Duane N Taylor, Jr.
(74) *Attorney, Agent, or Firm* — Nathan & Associates; Menachem Nathan

(57) ABSTRACT

A backlight driving method and a display panel are provided. The backlight driving method provided by the present application uses pulse width modulation technology to modulate a low-level pulse width of a scan signal. By increasing a low-level pulse width to increase the pulse period, a number of high-level pulses is reduced, thereby reducing a high-level pulse time. Therefore, a time for a TFT to receive a high-level voltage is also reduced, thereby improving a stability of the TFT and also improving a problem of a threshold voltage drift of the TFT.

20 Claims, 3 Drawing Sheets

(56) References Cited

FOREIGN PATENT DOCUMENTS

| | | | |
|---|---|---|---|
| CN | 111276097 | A | 6/2020 |
| CN | 111508430 | A | 8/2020 |
| CN | 111951736 | A | 11/2020 |
| CN | 112331130 | A | 2/2021 |

BACKLIGHT DRIVING METHOD AND DISPLAY PANEL

FIELD OF DISCLOSURE

The present disclosure relates to displays, and more particularly to a backlight driving method and a display panel.

BACKGROUND OF DISCLOSURE

Mini light emitting diode (Mini LED) backplane driving currently have active matrix (AM) driving and passive matrix (PM) driving. Since a thin film transistor (TFT) in the Mini LED AM driving can play a switch role, it can save a lot of integrated circuit (IC) compared with PM, so AM driving has lower cost than PM driving. AM driving backplane technology currently uses amorphous silicon (a-Si), indium gallium zinc oxide (IGZO) and low-temperature polysilicon (LTPS). A stability of TFT greatly affects the brightness and taste of Mini LEDs. In a process of research and practice of the prior art, an inventor of the present application found that the stability of TFT is strongly related to a time when the scan signal is high (Scan high). A high-level time which is too long will aggravate a threshold voltage shift (Vth shift) of the TFT, resulting in a decrease in stability.

SUMMARY OF DISCLOSURE

Technical Problem

The present application provides a backlight driving method and a display panel, which can improve a stability of a thin film transistor.

Technical Solution

The present application provides a backlight driving method, comprising steps of:

providing a pulse width modulation signal;

modulating a low-level pulse width of a scan signal to be modulated according to the pulse width modulation signal to increase a pulse period of the scan signal to be modulated, such that a number of high-level pulses of the modulated scan signal is less than a number of high-level pulses of the scan signal to be modulated;

outputting the modulated scan signal to a backlight driving circuit.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one of the initial pulse periods into a first pulse period, and a time of the first pulse period is a time of at least two of the initial pulse periods, such that the modulated scan signal includes a plurality of the first pulse periods.

Optionally, in some embodiments of the present application, the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one of the initial pulse periods and p of the first pulse periods, wherein the time of the first pulse period is the time of two of the initial pulse periods, and wherein a value of p is 63.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one initial pulse period into a first pulse period, and modulating at least one initial pulse period into a second pulse period, such that the modulated scan signal includes a plurality of the first pulse periods and a plurality of second pulse periods, wherein a time of the initial pulse period is less than a time of the first pulse period, and the time of the first pulse period is less than a time of the second pulse period.

Optionally, in some embodiments of the present application, the time of the first pulse period is the time of two of the initial pulse periods, and the time of the second pulse period is the time of four of the initial pulse periods.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width and modulating a plurality of initial pulse periods in a frame into n first pulse periods and m second pulse periods, such that the modulated scan signal in one frame includes one initial pulse period, n first pulse periods, and m second pulse periods, wherein a time of the first pulse period is a time of two of the initial pulse periods, and a time of the second pulse period is a time of four of the initial pulse periods, and wherein a sum of n and m is 32, and m and n are positive integers greater than 1.

Optionally, in some embodiments of the present application, the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one initial pulse period, one first pulse period, and 31 second pulse periods.

Optionally, in some embodiments of the present application, the modulated scan signal includes one of the initial pulse period, one of the first pulse period, and 31 of the second pulse periods, all of which are sequentially disposed.

Optionally, in some embodiments of the present application, the backlight driving method is applied to a backlight driving circuit, and the backlight driving circuit includes a first transistor, a second transistor, a storage capacitor, and a light emitting device;

a source of the first transistor is connected to a cathode of the light emitting device, a drain of the first transistor is grounded, and a gate of the first transistor is electrically connected to the first node;

a source of the second transistor is connected to a data signal, a drain of the second transistor is electrically connected to a first node, and a gate of the second transistor is connected to the modulated scan signal;

a first end of the storage capacitor is electrically connected to the first node, and a second end of the storage capacitor is grounded;

an anode of the light emitting device is connected to a power signal.

Optionally, in some embodiments of the present application, when the modulated scan signal is at a high-level, the data signal is at a high-level, and a high-level pulse width of the data signal is greater than a high-level pulse width corresponding to the modulated scan signal.

Correspondingly, the present application provides a display panel. The display panel comprises a backlight module, wherein the backlight module is provided with a backlight driving circuit, and the backlight driving circuit is driven by a backlight driving method, wherein the backlight driving method comprises steps of:

providing a pulse width modulation signal;

modulating a low-level pulse width of a scan signal to be modulated according to the pulse width modulation signal to increase a pulse period of the scan signal to be modulated, such that a number of high-level pulses of the modulated scan signal is less than a number of high-level pulses of the scan signal to be modulated;

outputting the modulated scan signal to a backlight driving circuit.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one of the initial pulse periods into a first pulse period, and a time of the first pulse period is a time of at least two of the initial pulse periods, such that the modulated scan signal includes a plurality of the first pulse periods.

Optionally, in some embodiments of the present application, the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one of the initial pulse periods and p of the first pulse periods, wherein the time of the first pulse period is the time of two of the initial pulse periods, and wherein a value of p is 63.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one initial pulse period into a first pulse period, and modulating at least one initial pulse period into a second pulse period, such that the modulated scan signal includes a plurality of the first pulse periods and a plurality of second pulse periods, wherein a time of the initial pulse period is less than a time of the first pulse period, and the time of the first pulse period is less than a time of the second pulse period.

Optionally, in some embodiments of the present application, the time of the first pulse period is the time of two of the initial pulse periods, and the time of the second pulse period is the time of four of the initial pulse periods.

Optionally, in some embodiments of the present application, the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width and modulating a plurality of initial pulse periods in a frame into n first pulse periods and m second pulse periods, such that the modulated scan signal in one frame includes one initial pulse period, n first pulse periods, and m second pulse periods, wherein a time of the first pulse period is a time of two of the initial pulse periods, and a time of the second pulse period is a time of four of the initial pulse periods, and wherein a sum of n and m is 32, and m and n are positive integers greater than 1.

Optionally, in some embodiments of the present application, the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one initial pulse period, one first pulse period, and 31 second pulse periods.

Optionally, in some embodiments of the present application, the modulated scan signal includes one of the initial pulse period, one of the first pulse period, and 31 of the second pulse periods, all of which are sequentially disposed.

Optionally, in some embodiments of the present application, the backlight driving method is applied to a backlight driving circuit, and the backlight driving circuit includes a first transistor, a second transistor, a storage capacitor, and a light emitting device;

a source of the first transistor is connected to a cathode of the light emitting device, a drain of the first transistor is grounded, and a gate of the first transistor is electrically connected to the first node;

a source of the second transistor is connected to a data signal, a drain of the second transistor is electrically connected to a first node, and a gate of the second transistor is connected to the modulated scan signal;

a first end of the storage capacitor is electrically connected to the first node, and a second end of the storage capacitor is grounded;

an anode of the light emitting device is connected to a power signal.

Optionally, in some embodiments of the present application, when the modulated scan signal is at a high-level, the data signal is at a high-level, and a high-level pulse width of the data signal is greater than a high-level pulse width corresponding to the modulated scan signal.

Advantageous Effect

The present application discloses a backlight driving method and a display panel. The backlight driving method provided by the present application uses pulse width modulation technology to modulate a low-level pulse width of a scan signal. By increasing a low-level pulse width to increase the pulse period, a number of high-level pulses is reduced, thereby reducing a high-level pulse time. Therefore, a time for a TFT to receive a high-level voltage is also reduced, thereby improving a stability of the TFT and also improving a problem of a threshold voltage drift of the TFT.

DESCRIPTION OF DRAWINGS

In order to explain technical solutions in this application more clearly, the following will briefly introduce the drawings that need to be used in description of embodiments. Obviously, the drawings in following description are only some embodiments of the present application. For those skilled in the art, other drawings can be obtained based on these drawings without creative work.

DETAILED DESCRIPTION OF PREFERRED EMBODIMENTS

Technical solutions in this application will be clearly and completely described below in conjunction with the drawings in this application. Obviously, described embodiments are only a part of embodiments of the present application, rather than all the embodiments. Based on the embodiments in this application, all other embodiments obtained by those skilled in the art without creative work shall fall within protection scope of this application.

In this application, it should be understood that terms such as "including" or "having" are intended to indicate the existence of the features, numbers, steps, behaviors, components, parts, or combinations thereof disclosed in this specification, and it is not intended to exclude the possibility that one or more other features, numbers, steps, behaviors, components, parts or combinations thereof exist or be added.

The application provides a backlight driving method and a display panel. Detailed descriptions are given below. It should be noted that the order of description in the following embodiments is not meant to limit the preferred order of the embodiments.

Figure 1:
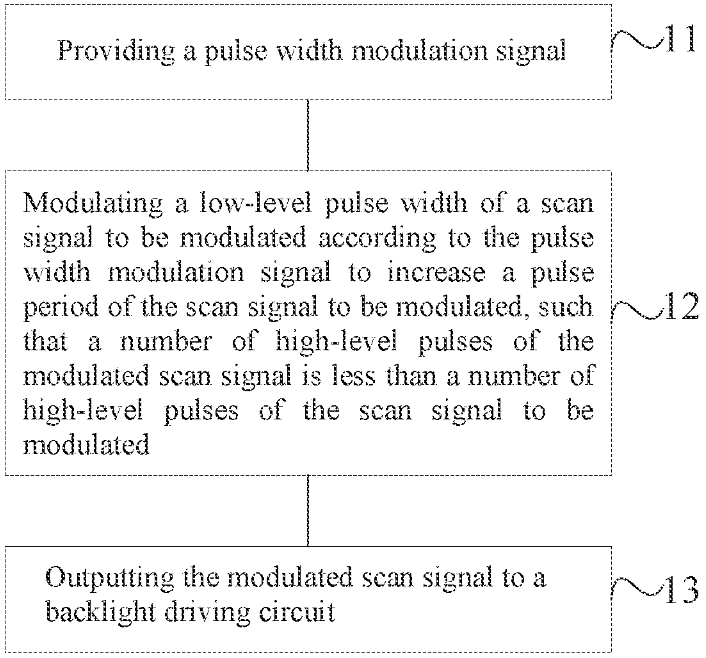
FIG. 1 is a schematic flowchart of a backlight driving method provided by the present application.

Refer to FIG. 1. FIG. 1 is a schematic flowchart of a backlight driving method provided by the present application. A backlight driving method provided by the present application specifically includes the following steps:

In step 11, a pulse width modulation signal is provided.

Pulse width modulation (PWM) technology refers to an equivalent of obtaining a desired waveform by modulating width of a series of pulses. PWM technology is a very effective technology that uses the digital signal of the microprocessor to control the analog circuit. Pulse width modulation control technology is simple in structure, easy to implement, and the technology is relatively mature, and it has been widely used. The pulse width modulation signal of the present application is obtained through PWM technology, which is not repeated here.

In step 12, a low-level pulse width of a scan signal to be modulated is modulated according to the pulse width modulation signal so as to increase a pulse period of the scan signal to be modulated, such that a number of high-level pulses of the modulated scan signal is less than a number of high-level pulses of the scan signal to be modulated.

Figure 2:
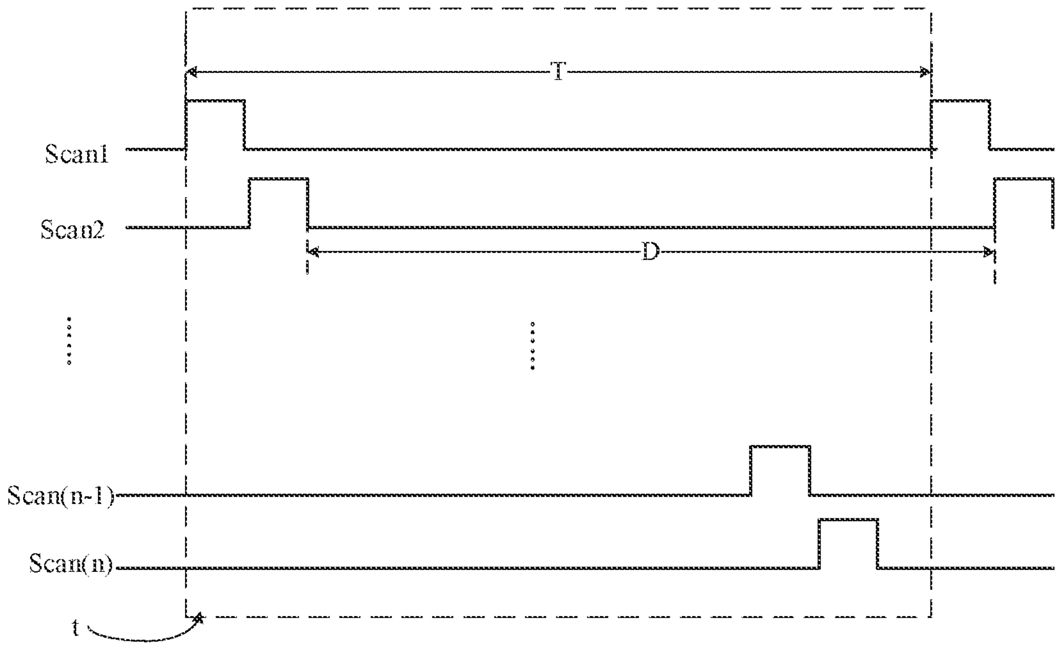
FIG. 2 is a schematic diagram of a scan signal provided by the present application.

Refer to FIG. 2. FIG. 2 is a schematic diagram of a scan signal provided by the present application. Generally, a display panel is provided with multiple rows of backlight driving units, and each row of backlight driving units corresponds to a row of backlight driving circuits. The backlight driving circuit of each row is respectively controlled by a scan signal to scan the backlight driving circuit row by row. As shown in FIG. 2, taking the display panel with n rows of backlight driving circuits as an example, there are n rows of scan signals respectively, which are indicated as Scan1, Scan2, . . . Scan(n−1), and Scan(n). A high-level pulse width plus an adjacent low-level pulse width is a pulse period T. That is, the pulse period T represents the time from a high-level pulse to the next high-level pulse, wherein the low-level pulse width D can also be referred to as a pulse interval.

In a scan signal of the backlight drive circuit shown in FIG. 2, a time from the scan signal Scan1 of the first line to scan line by line to the scan signal Scan(n) of the nth line, plus a vertical blanking interval at a beginning of the next scan after scanning n lines is called a minimum subfield time t. The minimum subfield time t is determined according to a gray-scale and resolution of the display panel. For example, for a display panel with 128 gray levels and a resolution of 240 Hz, one frame time is 4.17 milliseconds (ms), and there are 128 gray levels in one frame, the minimum subfield time t is 32.6 microseconds (μs). The above is only an example, to better illustrate the concept of the minimum subfield time t, and not to limit the application.

Figure 3:
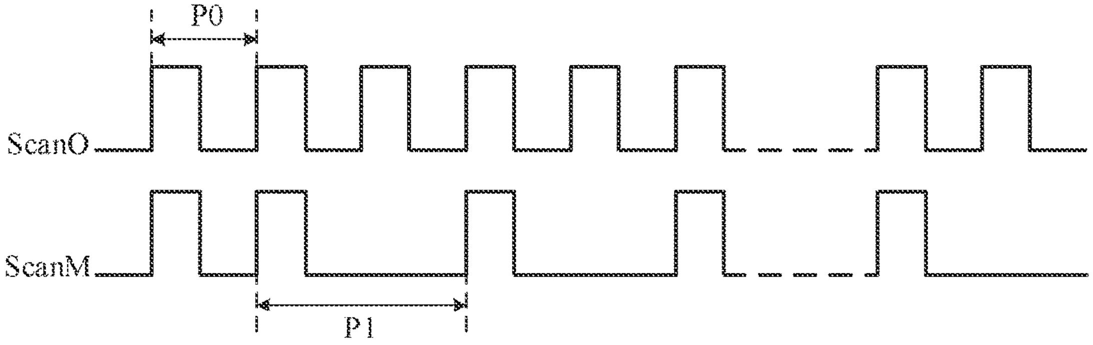
FIG. 3 is a first schematic diagram before and after modulation of a scan signal provided by the present application.

Please refer to FIG. 3. FIG. 3 is a first schematic diagram of a scan signal before and after modulation provided by the present application. FIG. 3 takes the scan signal of a certain line in FIG. 2 as an example, and compresses the pulse period of the scan signal in one frame for illustration.

In some embodiment, according to the pulse width modulation signal, the low-level pulse width of the scan signal ScanO to be modulated is modulated to increase a pulse period of the scan signal ScanO to be modulated and reduce a number of high-level pulses of the scan signal ScanO to be modulated, which specifically includes following steps:

The low-level pulse width is increased, and at least one initial pulse period P0 is modulated into a first pulse period P1. A time of the first pulse period P1 is a time of at least two initial pulse periods P0, so that a number of high-level pulses of the modulated scan signal is less than a number of high-level pulses of the scan signal to be modulated. The scan signal ScanO to be modulated includes a plurality of initial pulse periods P0, and the modulated scan signal ScanM includes a plurality of first pulse periods P1.

The present application does not limit the number of the initial pulse period P0 and the first pulse period P1 in the modulated scan signal ScanM, and it only needs to make a sum of the pulse periods occupy one frame after modulation. For example, the modulated scan signal ScanM may include an initial pulse period P0 and a plurality of first pulse periods P1. The modulated scan signal ScanM may include a plurality of initial pulse periods P0 and a first pulse period P1.

Specifically, the time of the first pulse period P1 may be a time of two initial pulse periods P0, a time of three initial pulse periods P0, a time of four initial pulse periods P0, a time of five initial pulse periods P0, a time of six initial pulse periods P0, a time of seven initial pulse periods P0, a time of eight initial pulse periods P0, a time of ten initial pulse periods P0, a time of sixteen initial pulse periods P0, or a time of thirty-two initial pulse periods P0.

Further, please continue to refer to FIG. 3. The low-level pulse width is increased, and a plurality of initial pulse periods P0 in one frame are modulated into p first pulse periods P1. The scan signal ScanO to be modulated in one frame includes 127 initial pulse periods P0, and the scan signal ScanM modulated in one frame includes an initial pulse period P0 and p first pulse periods P1. A time of the first pulse period P1 is a time of two initial pulse periods P0. Among them, a value of p is 63.

Specifically, a display panel with 127 gray levels has 127 minimum subfield times t within one frame time. The scan signal ScanO to be modulated for one line has 127 initial pulse periods P0. At this time, p is 127, and the time of the first pulse period P1 is the time of two initial pulse periods P0. Therefore, the 126 initial pulse periods P0 in one frame are modulated into 63 first pulse periods P1. Then, the modulated scan signal ScanM includes an initial pulse period P0 and 63 first pulse periods P1. Finally, 127 high-level pulses in one frame of the scan signal ScanO to be modulated are modulated into 64 high-level pulses of the modulated scan signal ScanM. That is, the time that the TFT is subjected to the high-level voltage is reduced by half, thereby improving a drift of the threshold voltage.

In FIG. 3, an arrangement sequence of the initial pulse period P0 and the first pulse period P1 is only for illustration, and not as a limitation to the present application.

Figure 4:
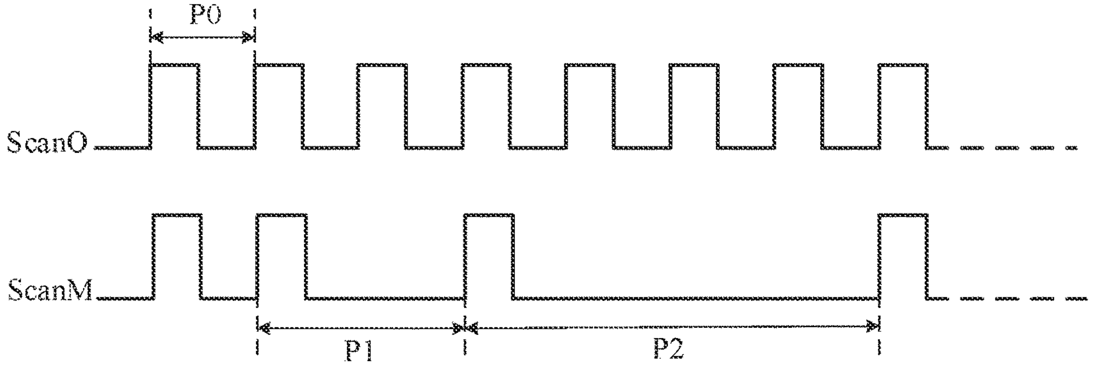
FIG. 4 is a second schematic diagram before and after modulation of a scan signal provided by the present application.

Please refer to FIG. 4. FIG. 4 is a second schematic diagram of the scan signal before and after modulation provided by the present application. Similarly, FIG. 4 takes a scan signal of a certain line in FIG. 2 as an example, and compresses a pulse period of the scan signal in one frame for illustration.

In some embodiments, the step of modulating a low-level pulse width of a scan signal ScanO to be modulated according to the pulse width modulation signal so as to increase a pulse period of the scan signal ScanO to be modulated, such that a number of high-level pulses of the modulated scan signal ScanM is less than a number of high-level pulses of the scan signal ScanO to be modulated, comprises:

increasing the low-level pulse width, modulating at least one initial pulse period P0 into a first pulse period P1, and modulating at least one initial pulse period P0 into a second pulse period P2, such that a number of high-level pulses of the modulated scan signal ScanM is less than a number of high-level pulses of the scan signal ScanO to be modulated, wherein the scan signal ScanO to be modulated includes a plurality of the first pulse periods P1 and a plurality of second pulse periods P2, wherein a time of the initial pulse period P0 is less than a time of the first pulse period P1, and the time of the first pulse period P1 is less than a time of the second pulse period P2.

The present application does not limit the number of the initial pulse period P0, the first pulse period P1, and the second pulse period P2 in the modulated scan signal ScanM, and it only needs to make the sum of the pulse periods occupy one frame after modulation. For example, the modulated scan signal ScanM may include an initial pulse period P0, a first pulse period P1, and a plurality of second pulse periods P2. The modulated scan signal ScanM may include an initial pulse period P0, a plurality of first pulse periods P1, and a second pulse period P2.

Specifically, the time of the first pulse period P1 may be a time of two initial pulse periods P0, a time of three initial pulse periods P0, a time of four initial pulse periods P0, a time of five initial pulse periods P0, a time of six initial pulse periods P0, a time of seven initial pulse periods P0, a time of eight initial pulse periods P0, a time of ten initial pulse periods P0, or a time of sixteen initial pulse periods P0.

Specifically, the time of the second pulse period P2 may be a time of two initial pulse periods P0, a time of three initial pulse periods P0, a time of four initial pulse periods P0, a time of five initial pulse periods P0, a time of six initial pulse periods P0, a time of seven initial pulse periods P0, a time of eight initial pulse periods P0, a time of ten initial pulse periods P0, a time of sixteen initial pulse periods P0, or a time of thirty-two initial pulse periods P0

In some embodiments, the time of the first pulse period P1 is the time of two initial pulse periods P0, and the time of the second pulse period P2 is the time of four initial pulse periods P0.

Further, please continue to refer to FIG. 4. The plurality of initial pulse periods P0 are modulated into n first pulse periods P1 and m second pulse periods P2. The modulated scan signal ScanM includes an initial pulse period P0, n first pulse periods P1, and m second pulse periods P2. The time of the first pulse period P1 is the time of two initial pulse periods P0, and the time of the second pulse period P2 is the time of four initial pulse periods P0, wherein a sum of n and m is 32, and m and n are positive integers greater than 1.

In some embodiments, a value of n is 1, and a value of m is 31. The following takes a display panel with 127 gray levels as an example for description. The display panel with 127 gray-scale has 127 minimum subfield times t within one frame time. The scan signal ScanO to be modulated for one line has 127 initial pulse periods P0. The value of n is 1, and the value of m is 31. Therefore, the 126 initial pulse periods P0 in one frame are modulated into one first pulse period P1 and 31 second pulse periods P2. The modulated scan signal ScanM includes an initial pulse period P0, a first pulse period P1, and 31 second pulse periods P2. Finally, 127 high-level pulses in one frame of the scan signal ScanO to be modulated are modulated into 33 high-level pulses of the modulated scan signal ScanM. That is, the time that the TFT is subjected to the high-level voltage is reduced to one third of the original time. This greatly reduces the time that the TFT is subjected to pressure, and also greatly improves the stability of the TFT, thereby improving the drift of the threshold voltage.

In FIG. 4, an arrangement sequence of the initial pulse period P0, the first pulse period P1, and the second pulse period P2 is only for illustration, and not as a limitation to the present application.

In one embodiment, the display panel is a display panel with 127 gray levels. The display panel with 127 gray levels has 127 minimum subfield times t within one frame time. The scan signal ScanO to be modulated for one line has 127 initial pulse periods P0. According to the pulse width modulation signal, the scan signal ScanO to be modulated is modulated. The modulated scan signal ScanM has an initial pulse period P0, a first pulse period P1, a second pulse period P2, a third pulse period P3, a fourth pulse period P4, and three fifth pulse periods P5.

A time of the first pulse period P1 is a time of two initial pulse periods P0. A time of the second pulse period P2 is a time of four initial pulse periods P0. A time of the third pulse period P3 is a time of eight initial pulse periods P0. A time of the fourth pulse period P4 is a time of sixteen initial pulse periods P0. A time of the fifth pulse period P5 is a time of thirty-two initial pulse periods P0.

Therefore, the 127 high-level pulses in the scan signal ScanO to be modulated are modulated into 8 high-level pulses of the modulated scan signal ScanM. A number of high-level pulses is greatly reduced, and a high-level pulse time is greatly shortened. A high voltage application time of the scan signal on the TFT is greatly reduced, a stability of the TFT is improved, and a problem of threshold voltage drift is well improved.

In an actual test, modulating the pulse period to a time longer than thirty-two initial pulse periods P0 will affect a luminous brightness of the display panel. Therefore, in order to ensure the display effect, the pulse period range after modulation is controlled between 2 and 32 initial pulse periods P0.

In step 13, the modulated scan signal is output to the backlight drive circuit.

Figure 5:
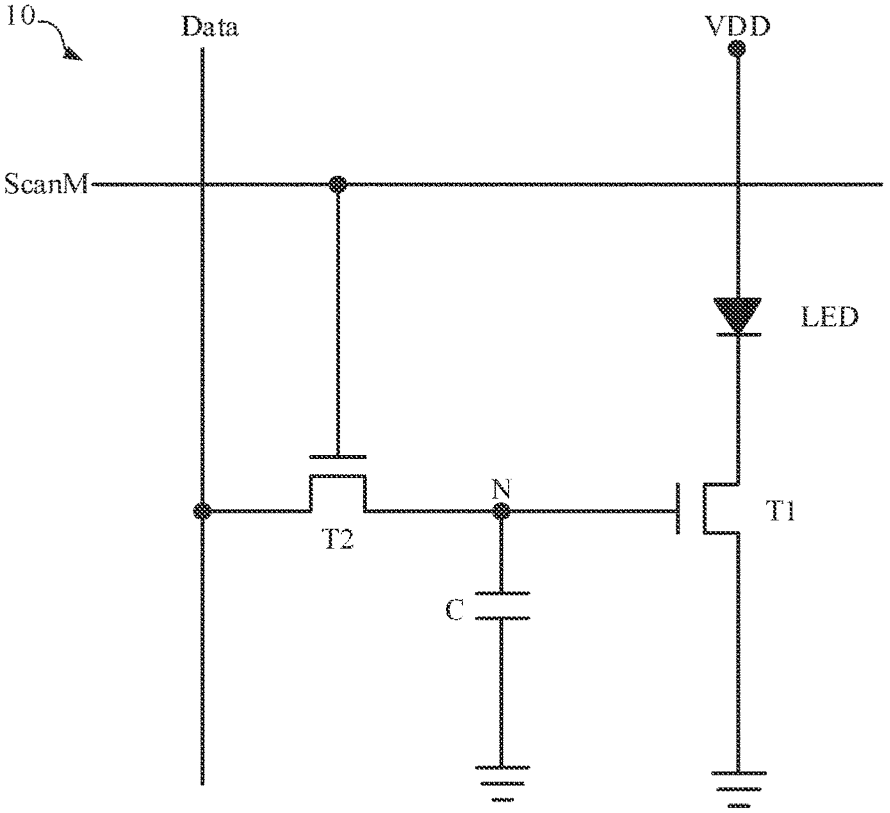
FIG. 5 is a schematic circuit diagram of a backlight driving circuit in a backlight driving method provided by the present application.

Please refer to FIG. 5. FIG. 5 is a schematic circuit diagram of a backlight driving circuit in a backlight driving method provided by the present application. The backlight driving circuit 10 includes a first transistor T1, a second transistor T2, a storage capacitor C, and a light emitting device LED. A source of the first transistor T1 is connected to a cathode of the light emitting device LED, a drain of the first transistor T1 is grounded, and a gate of the first transistor T1 is electrically connected to a first node N. A source of the second transistor T2 is connected to a data signal Data, a drain of the second transistor T2 is electrically connected to the first node N, and a gate of the second transistor T2 is connected to the modulated scan signal ScanM. A first end of the storage capacitor C is electrically connected to the first node N, and a second end of the storage capacitor C is grounded. An anode of the light emitting device LED is connected to a power signal VDD.

Please refer to FIG. 4 and FIG. 5 simultaneously. In an embodiment, the modulated scan signal ScanM includes an initial pulse period P0, a first pulse period P1, and 31 second pulse periods P2 that are sequentially disposed. By adopting this sequence, a potential of the first node N can be raised during the first initial pulse period P0, and the storage capacitor C can be charged to ensure the light emitting effect of the light emitting device LED. Later, extending the low-level pulse width can reduce an influence of the low-level pulse width on the subsequent light emitting of the light emitting device LED.

Figure 6:
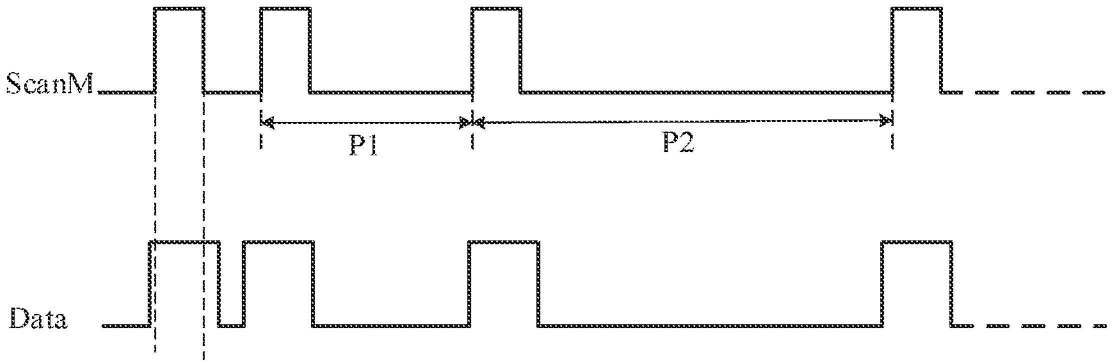
FIG. 6 is a schematic diagram of a timing sequence of the backlight driving circuit in the backlight driving method provided by the present application.

Please refer to FIG. 6, which is a schematic diagram of a timing sequence of a backlight driving circuit in a backlight driving method provided by the present application. When the modulated scan signal ScanM is at a high-level, a data signal Data is at a high-level, and a high-level pulse width of the data signal Data is greater than a high-level pulse width corresponding to the modulated scan signal ScanM.

The modulated scan signal ScanM provided in the present application reduces the number of high-level pulses, and increases the low-level pulse width. The high-level pulse width of the data signal Data is greater than the high-level pulse width of the modulated scan signal ScanM, and an input of the data signal Data can be guaranteed when the modulated scan signal ScanM controls the second transistor T2 to turn on. When the modulated scan signal ScanM controls the second transistor T2 to turn off, a potential of the first node N is kept high, so that when the modulated scan signal ScanM is at a low-level, the light emitting device LED can still emit light uniformly.

Such a timing setting can avoid an influence of the modulated scan signal ScanM on the light emitting of the display panel.

The backlight driving method provided by the present application modulates the low-level pulse width of the scanning signal through pulse width modulation technology. By increasing the low-level pulse width to increase the pulse period, the number of high-level pulses is reduced, thereby reducing the high-level pulse time. The time for the TFT to receive the high-level voltage is also reduced, thereby improving the stability of the TFT and also improving the problem of the threshold voltage drift of the TFT.

Figure 7:
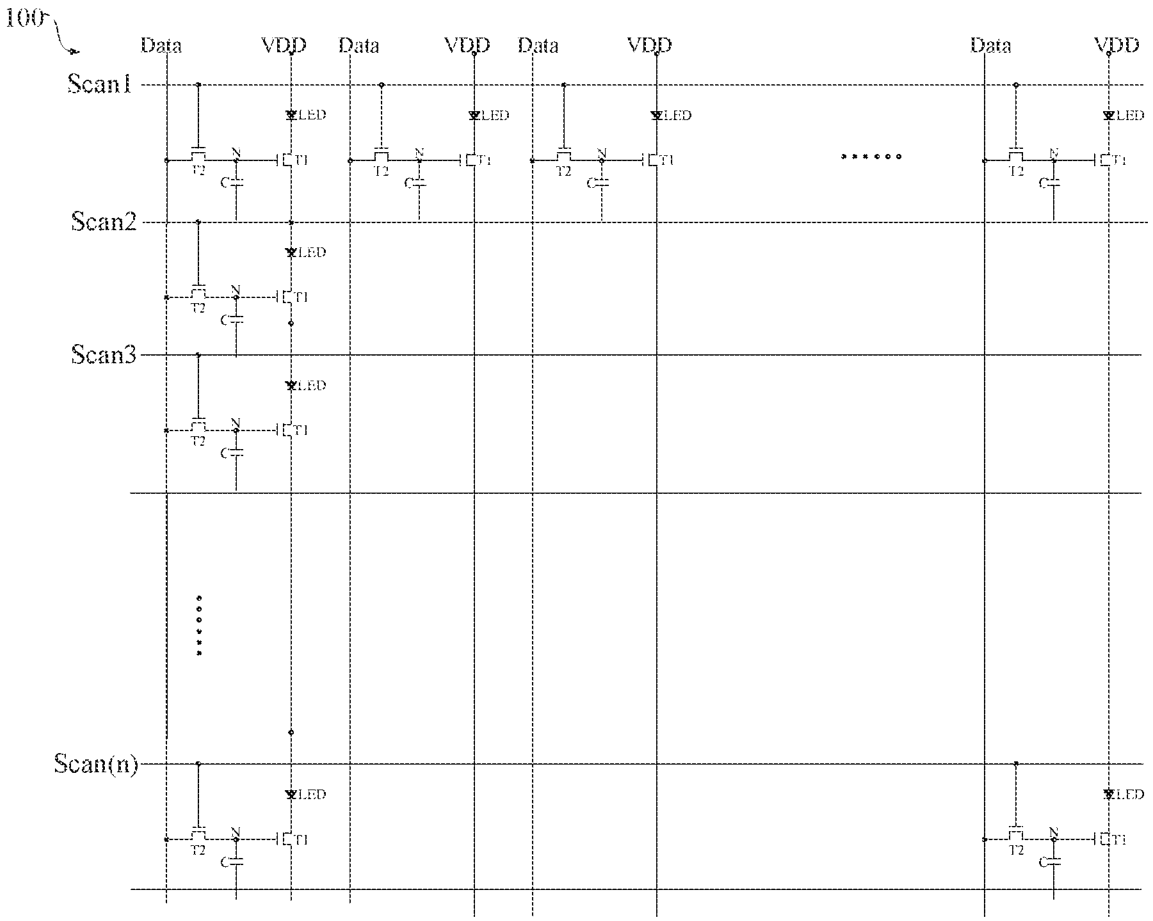
FIG. 7 is a schematic diagram of a structure of a display panel provided by the present application.

The present application provides a display panel. Please refer to FIG. 7. FIG. 7 is a schematic structural diagram of the display panel provided by the present application. The display panel 100 provided in the present application includes a backlight module, and a plurality of rows of backlight driving circuits are arranged on the backlight module, and the backlight driving circuit is driven by the backlight driving method described above.

The display panel 100 provided in this application can be used in electronic devices, which can be at least of smart-phones, tablet personal computers, mobile phones, video phones, e-book readers, desktop PCs, laptop PCs, netbook computers, workstations, servers, personal digital assistants, portable multimedia players, MP3 players, mobile medical machines, cameras, game consoles, digital cameras, car navigation systems, electronic billboards, ATMs, or wear-able devices.

The display panel 100 provided by the present application includes a backlight module, and the backlight module is provided with a backlight driving circuit. The backlight driving circuit uses a backlight driving method to drive. The backlight driving method modulates the low-level pulse width of the scanning signal through pulse width modulation technology. By increasing the low-level pulse width to increase the pulse period, the number of high-level pulses is reduced, thereby reducing the high-level pulse time. The time for the TFT to receive the high-level voltage is also reduced, thereby improving the stability of the TFT and also improving the problem of the threshold voltage drift of the TFT.

The backlight driving method and the display panel provided by the present application are described in detail above. Specific examples are used in this article to illustrate the principles and implementation of the application, and the descriptions of the above examples are only used to help understand the methods and core ideas of the application. Simultaneously, for those skilled in the art, according to the idea of this application, there will be changes in the specific implementation and the scope of application. In summary, the content of this specification should not be construed as a limitation on this application.

The invention claimed is:

1. A backlight driving method, comprising steps of:

providing a pulse width modulation signal;

modulating a low-level pulse width of a scan signal to be modulated according to the pulse width modulation signal to increase a pulse period of the scan signal to be modulated, such that a number of high-level pulses of the modulated scan signal is less than a number of high-level pulses of the scan signal to be modulated; and outputting the modulated scan signal to a backlight driving circuit.

2. The backlight driving method according to claim 1, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one of the initial pulse periods into a first pulse period, and a time of the first pulse period is a time of at least two of the initial pulse periods, such that the modulated scan signal includes a plurality of the first pulse periods.

3. The backlight driving method according to claim 2, wherein the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one of the initial pulse periods and p of the first pulse periods, wherein the time of the first pulse period is the time of two of the initial pulse periods, and wherein a value of p is 63.

4. The backlight driving method according to claim 1, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one initial pulse period into a first pulse period, and modulating at least one initial pulse period into a second pulse period, such that the modulated scan signal includes a plurality of the first pulse periods and a plurality of second pulse periods, wherein a time of the initial pulse period is less than a time of the first pulse period, and the time of the first pulse period is less than a time of the second pulse period.

5. The backlight driving method according to claim 4, wherein the time of the first pulse period is the time of two of the initial pulse periods, and the time of the second pulse period is the time of four of the initial pulse periods.

6. The backlight driving method according to claim 1, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width and modulating a plurality of initial pulse periods in a frame into n first pulse periods and m second pulse periods, such that the modulated scan signal in one frame includes one initial pulse period, n first pulse periods, and m second pulse periods, wherein a time of the first pulse period is a time of two of the initial pulse periods, and a time of the second pulse period is a time of four of the initial pulse periods, and wherein a sum of n and m is 32, and m and n are positive integers greater than 1.

7. The backlight driving method according to claim 6, wherein the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one initial pulse period, one first pulse period, and 31 second pulse periods.

8. The backlight driving method according to claim 7, wherein the modulated scan signal includes one of the initial pulse period, one of the first pulse period, and 31 of the second pulse periods, all of which are sequentially disposed.

9. The backlight driving method according to claim 1, wherein the backlight driving method is applied to a backlight driving circuit, and the backlight driving circuit includes a first transistor, a second transistor, a storage capacitor, and a light emitting device;

a source of the first transistor is connected to a cathode of the light emitting device, a drain of the first transistor is grounded, and a gate of the first transistor is electrically connected to the first node;

a source of the second transistor is connected to a data signal, a drain of the second transistor is electrically connected to a first node, and a gate of the second transistor is connected to the modulated scan signal;

a first end of the storage capacitor is electrically connected to the first node, and a second end of the storage capacitor is grounded; and an anode of the light emitting device is connected to a power signal.

10. The backlight driving method according to claim 9, wherein, when the modulated scan signal is at a high-level, the data signal is at a high-level, and a high-level pulse width of the data signal is greater than a high-level pulse width corresponding to the modulated scan signal.

11. A display panel, comprising a backlight module, wherein the backlight module is provided with a backlight driving circuit, and the backlight driving circuit is driven by a backlight driving method, wherein the backlight driving method comprises steps of:

providing a pulse width modulation signal;

modulating a low-level pulse width of a scan signal to be modulated according to the pulse width modulation signal to increase a pulse period of the scan signal to be modulated, such that a number of high-level pulses of the modulated scan signal is less than a number of high-level pulses of the scan signal to be modulated; and outputting the modulated scan signal to a backlight driving circuit.

12. The display panel according to claim 11, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one of the initial pulse periods into a first pulse period, and a time of the first pulse period is a time of at least two of the initial pulse periods, such that the modulated scan signal includes a plurality of the first pulse periods.

13. The display panel according to claim 12, wherein the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one of the initial pulse periods and p of the first pulse periods, wherein the time of the first pulse period is the time of two of the initial pulse periods, and wherein a value of p is 63.

14. The display panel according to claim 11, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width, modulating at least one initial pulse period into a first pulse period, and modulating at least one initial pulse period into a second pulse period, such that the modulated scan signal includes a plurality of the first pulse periods and a plurality of second pulse periods, wherein a time of the initial pulse period is less than a time of the first pulse period, and the time of the first pulse period is less than a time of the second pulse period.

15. The display panel according to claim 14, wherein the time of the first pulse period is the time of two of the initial pulse periods, and the time of the second pulse period is the time of four of the initial pulse periods.

16. The display panel according to claim 11, wherein the scan signal to be modulated in one frame includes a plurality of initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

increasing the low-level pulse width and modulating a plurality of initial pulse periods in a frame into n first pulse periods and m second pulse periods, such that the modulated scan signal in one frame includes one initial pulse period, n first pulse periods, and m second pulse periods, wherein a time of the first pulse period is a time of two of the initial pulse periods, and a time of the second pulse period is a time of four of the initial pulse periods, and wherein a sum of n and m is 32, and m and n are positive integers greater than 1.

17. The display panel according to claim 16, wherein the scan signal to be modulated in one frame includes 127 initial pulse periods, and wherein the step of the low-level pulse width of the scan signal to be modulated according to the pulse width modulation signal to increase the pulse period of the scan signal to be modulated, such that the number of high-level pulses of the modulated scan signal is less than the number of high-level pulses of the scan signal to be modulated, comprises:

modulating the scan signal to be modulated in one frame to include one initial pulse period, one first pulse period, and 31 second pulse periods.

18. The display panel according to claim 17, wherein the modulated scan signal includes one of the initial pulse period, one of the first pulse period, and 31 of the second pulse periods, all of which are sequentially disposed.

19. The display panel according to claim 11, wherein the backlight driving method is applied to a backlight driving circuit, and the backlight driving circuit includes a first transistor, a second transistor, a storage capacitor, and a light emitting device;

a source of the first transistor is connected to a cathode of the light emitting device, a drain of the first transistor is grounded, and a gate of the first transistor is electrically connected to the first node;

a source of the second transistor is connected to a data signal, a drain of the second transistor is electrically connected to a first node, and a gate of the second transistor is connected to the modulated scan signal;

a first end of the storage capacitor is electrically connected to the first node, and a second end of the storage capacitor is grounded; and an anode of the light emitting device is connected to a power signal.

20. The display panel according to claim 19, wherein, when the modulated scan signal is at a high-level, the data signal is at a high-level, and a high-level pulse width of the data signal is greater than a high-level pulse width corresponding to the modulated scan signal.

* * * * *